United States Patent [19]

Carroll

[11] Patent Number: 5,572,401
[45] Date of Patent: *Nov. 5, 1996

[54] WEARABLE PERSONAL COMPUTER SYSTEM HAVING FLEXIBLE BATTERY FORMING CASING OF THE SYSTEM

[75] Inventor: David W. Carroll, Northfield, Minn.

[73] Assignee: Key Idea Development L.L.C., Northfield, Minn.

[ * ] Notice: The term of this patent shall not extend beyond the expiration date of Pat. No. 5,555,490.

[21] Appl. No.: 330,134

[22] Filed: Oct. 25, 1994

Related U.S. Application Data

[63] Continuation-in-part of Ser. No. 166,222, Dec. 13, 1993.

[51] Int. Cl.$^6$ .................. G06F 1/16; H05K 7/10
[52] U.S. Cl. .................. 361/683; 429/127
[58] Field of Search .................. 429/127; 364/708.1; 361/680–686, 724

[56] References Cited

U.S. PATENT DOCUMENTS

| | | |
|---|---|---|
| 2,156,504 | 5/1939 | Liss . |
| 2,798,896 | 7/1957 | Bly .................. 429/127 |
| 3,588,359 | 6/1971 | Cribb . |
| 3,744,025 | 7/1973 | Bilgutay . |
| 3,876,863 | 4/1975 | Boone . |
| 3,956,740 | 5/1976 | Jones et al. . |
| 4,087,864 | 5/1978 | LaBove et al. . |
| 4,096,577 | 6/1978 | Ferber et al. . |
| 4,104,728 | 8/1978 | Kasubuchi . |
| 4,364,112 | 12/1982 | Onodera et al. . |
| 4,545,023 | 10/1985 | Mizzi .................. 361/680 X |
| 4,607,156 | 8/1986 | Koppenaal et al. . |
| 4,633,881 | 1/1987 | Moore et al. . |
| 4,690,653 | 9/1987 | Goldberg .................. 2/173 X |
| 4,719,462 | 1/1988 | Hawkins . |
| 4,749,875 | 6/1988 | Hara .................. 429/127 X |

(List continued on next page.)

FOREIGN PATENT DOCUMENTS

| | | |
|---|---|---|
| 0264956 | 4/1988 | European Pat. Off. . |
| 1887091 | 3/1975 | United Kingdom . |

OTHER PUBLICATIONS

Leslie Helm; Japan Turns Fanciful in the Evolution of Computers; Los Angeles Times; Oct. 14, 1991; Business Section; P. 1, Part D, Col. 2.

Computers of the '90s: A Brave New World; Newsweek, Oct. 24, 1988; pp. 52–54.

Optical Memory News; Apr. 1991; Issue 94: pp. 1 and 18.

IBM Technical Disclosure Bulletin, Wearable Interconnection for Portable Computers, vol. 34, No. 10B, Mar. 1992.

Stover, Dawn. "Radar on a chip: 101 uses in your life". Popular Science, Mar. 1995.

Franson, Paul. "It's all in the cards: PC cards can turn your laptop into everything from a pager to a global positioner". Inc., Mar. 19, 1996.

(List continued on next page.)

Primary Examiner—Michael W. Phillips
Attorney, Agent, or Firm—Patterson & Keough, P.A.

[57] ABSTRACT

A portable computer having elements for computing comprising a plurality of microcomputer elements, at least one flexible wearable member, structures for mounting a plurality of said microcomputer elements on said wearable member, and flexible signal relaying for electrically connecting said microcomputer elements in a user determined sequence. The computer preferably includes a plurality of PC card connectors receiving PC cards for performing a desired computing function. The wearable member includes a plurality of enclosures, with at least one of the PC card connectors being disposed within each enclosure. According to one embodiment, the portable computer includes a power supply to provide power to the microcomputer elements, the power supply including a flexible battery that forms a casing of the computer to protect the plurality of microcomputer elements.

23 Claims, 7 Drawing Sheets

U.S. PATENT DOCUMENTS

| | | |
|---|---|---|
| 4,756,940 | 7/1988 | Payne et al. . |
| 4,825,471 | 5/1989 | Jennings . |
| 4,827,534 | 5/1989 | Haugen .................................. 2/108 |
| 4,845,650 | 7/1989 | Meade et al. . |
| 4,882,685 | 11/1989 | Van Der Lely . |
| 4,899,039 | 2/1990 | Taylor et al. . |
| 4,916,441 | 4/1990 | Gombrich . |
| 5,003,300 | 3/1991 | Wells . |
| 5,007,427 | 4/1991 | Suzuki et al. . |
| 5,024,360 | 6/1991 | Rodriguez . |
| 5,029,260 | 7/1991 | Rollason . |
| 5,035,242 | 7/1991 | Franklin et al. . |
| 5,067,907 | 11/1991 | Shotey . |
| 5,078,134 | 1/1992 | Heilman et al. . |
| 5,105,067 | 4/1992 | Brekkestran et al. . |
| 5,144,120 | 9/1992 | Krichever et al. . |
| 5,158,039 | 10/1992 | Clark . |
| 5,208,449 | 5/1993 | Eastman et al. . |
| 5,267,181 | 11/1993 | George . |
| 5,272,324 | 12/1993 | Blevins . |
| 5,278,730 | 1/1994 | Kikinis .................................. 361/686 |
| 5,285,398 | 2/1994 | Janik .................................. 364/708.1 |
| 5,305,181 | 4/1994 | Schultz . |
| 5,305,244 | 4/1994 | Newman et al. . |
| 5,329,106 | 7/1994 | Hone et al. . |
| 5,416,310 | 5/1995 | Little .................................. 235/462 |

OTHER PUBLICATIONS

Studt, Tim. "PC Cards Nearly Do It All". R&D, Mar. 1994.

Lawrence Livermore National Laboratory, Micro–power Impulse Radar article, Feb. 14, 1995.

Ajluni, Cheryl. "Low–Cost Wideband Spread–Spectrum Device Promises to Revolutionize Radar Proximity Sensors". Electronic Design, Jul. 25, 1994.

"Lawrence Livermore Laboratory: Hoping to Make Highways Safer. Technology Transfer Business". Fall 1994. p. 40.

"Indoor Radar". Appliance Manufacturer, May 1994, p. 98.

"Advance in Radar Makes Compact Systems Possible". R&D Magazine, Jul. 1994, p. 10.

"ASIC–Based Vehicle, Tool Applications Seen For Livermore Radar". Electronic News, May 23, 1994, p. 40.

Airgo Communications Announces First Product to Integrate A Cellular Phone and Data/Fax Modem in a Single PC Card. Oct. 30, 1995.

Airgo Phonecard: The Ultimate Integration Between Your Mobile Phone and Notebook! brochure. No date.

Mobile Heaven: a Laptop, a Cell Phone and Epson's Cellular Fax/Modem brochure. Jan. 1995.

Chaplet Communications "TopPage" brochure. 1993.

Rockwell International's NavCard brochure. Sep. 1993.

Quadrant International's CardCam PCMCIA Video–In brochure. No date.

VLSI Vision's "The Word's First PCMCIA Camera", IC Card Systems & Design, Sep./Oct. 1994.

Socket's Mobile GPS Developers Toolkit Specifications brochure, 1983.

Envoy Data Corporation's PCMCIA Product Catalog. No date.

Fig. 15
Fig. 18
Fig. 16
Fig. 17
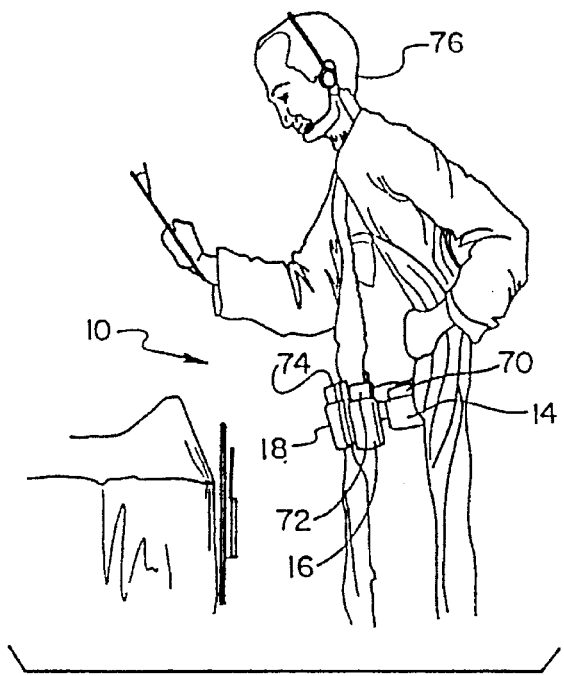
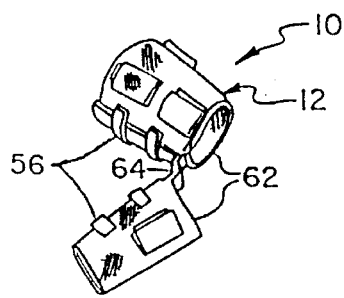
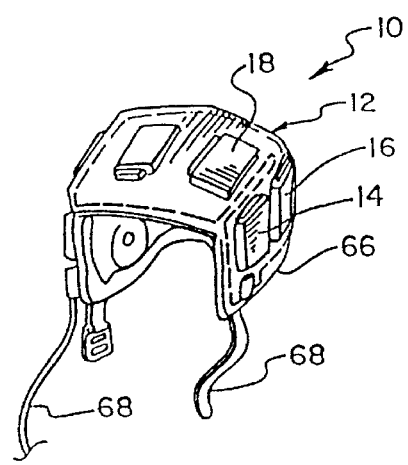

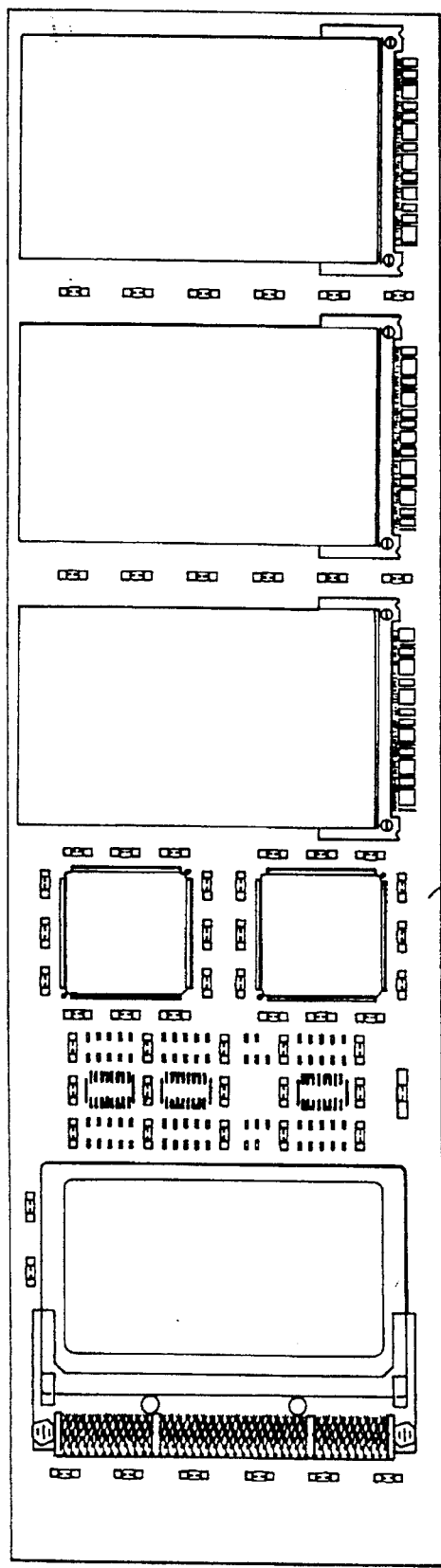
Fig. 23
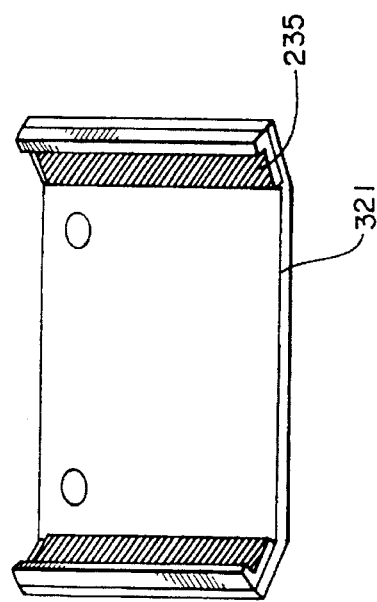
Fig. 25
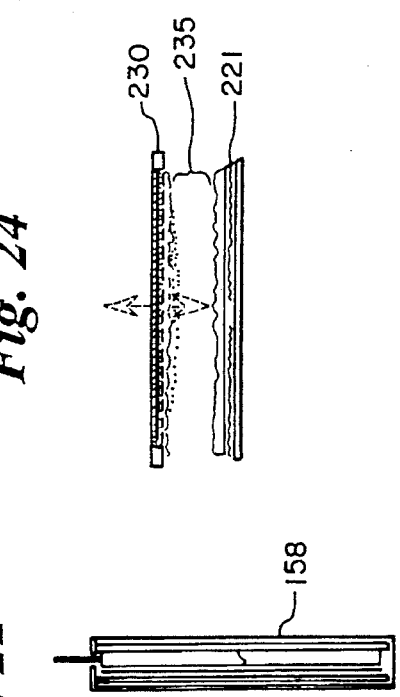
Fig. 24
Fig. 22

WEARABLE PERSONAL COMPUTER SYSTEM HAVING FLEXIBLE BATTERY FORMING CASING OF THE SYSTEM

CROSS-REFERENCE TO RELATED APPLICATION

This is a Continuation-in-Part of copending U.S. patent application Ser. No. 08/166,222, filed on Dec. 13, 1993.

BACKGROUND OF THE INVENTION

1. Field of Invention

The present invention broadly relates to a portable microcomputer system. More specifically, the present invention relates to a wearable support and interconnection structure for a modular microcomputer system.

2. Description of Related Art

Over time, computers have become faster, smaller and more efficient. As computers have been reduced in size, so too have their housing requirements been reduced. Computer power that once required special environmentally controlled rooms can now be found in desktop, laptop and even notebook computers that are not much larger than a rather thick 8½×11" paper tablet.

The recent adoption of the Personal Computer Memory Card International Association (PCMCIA) standard in the computer industry with the corresponding development of central processing units embodied in a small card-size package has further reduced the physical space required by a microcomputer system to an even smaller footprint. Under the PCMCIA or equivalent standard, the equivalent functionality of desktop and laptop computers can now be found in a set of card-size devices, each measuring no more than 6"×2.12"×10 mm. The exact dimensions of each card depends on the PCMCIA or equivalent release specifications to which the device conforms, for example, Type I, Type II or Type III PCMCIA cards. Being of such a small size, the PCMCIA cards, or PC cards as they are more generally known, are highly portable, having been designed to be carried individually in a shirt pocket, for example, just like a floppy diskette.

The primary use for PCMCIA cards has been to increase the functionality of notebook computers, such as the Hewlett Packard OmniBook 300. In this type of notebook computer, a number of PCMCIA slots are available along the periphery of the notebook computer housing. When a user plugs a PCMCIA card into one of the PCMCIA slots to expand the memory functionality, for example, of the notebook computer, the PCMCIA card extends outward from the periphery of the housing of the notebook computer. Unfortunately, this increases the overall footprint of the notebook computer roughly by the size of the PCMCIA cards, thereby making the notebook computer less portable.

An alternate configuration is the stacking of the PCMCIA cards along a vertical axis with a vertically-oriented rigid backplane-type connector to interconnect the various PCMCIA cards. The footprint here becomes the size of a single PCMCIA card while the height is dependent on the number of PCMCIA cards in the stack. This configuration, however, creates a box-like shape that is awkward to carry and is no longer possible to place in one's pocket.

Many work environments require an operator to do several tasks at once and, in those situations, requiring an operator to hold a computer in their hands would be a hindrance. While it is possible to carry a portable notebook computer, there is often not the space needed to set a notebook computer on in order to operate the notebook computer. Consequently, there is a need for a portable computer system that could be carried, and even operated, without requiring the use of an operator's hands and without requiring a desk space, for example, on which to locate the computer.

One example for such a need is a physician making the rounds of his or her patients. Typically, there is not the space to set up a readily accessible notebook computer and the physician may need to use his or her hands to perform an accurate diagnosis of the patient's condition. In addition, it may be helpful for the physician to have immediate access to all of the patient's current medical charts, various disease or drug reference materials, treatment and operating room schedules and the patient's past medical history. Typically, such diverse information might be stored on a number of different floppy diskettes or PCMCIA cards, requiring the physician to manually carry and switch these devices in order to access different information. The physician may also want to leave a message for a specialist to examine the patient or to make changes to the treatment or consult with other medical support staff. Ideally, integration of computers and telecommunications in a hands-free wearable housing could allow a physician to perform all these tasks as the physician moves from bedside to bedside.

As another example, it would be helpful in a fast food restaurant for an employee to use a portable microcomputer system to receive and enter orders, while filling prior orders. At the same time, if the employee had any questions about a current order, it would be helpful if he or she could automatically access instructional manuals or query to other employees without leaving his or her station. In addition, if the employee had access to a communications capable microcomputer system, the employee could alert the other employees in the store immediately to any problems or anticipated delays, even if the employee to be notified was not readily available. With ready access to a computer system for transmitting and storing information, these tasks could be routine. In a fast food restaurant environment, however, much of the food preparation is done by hand and requiring an employee to hold a computer system would be counter-productive.

A personal microcomputer system support and interconnection structure that provides for portable, hands-free operation of the microcomputer system, and that is adaptable for user-defined modular configuration of each modular component of the microcomputer system, would be greatly appreciated.

SUMMARY OF THE INVENTION

Embodiment according to the invention related to a wearable support and interconnection structure for a modular microcomputer system having a plurality of microcomputer cards housed in a plurality of microcomputer card pockets in a wearable garment. According to one embodiment, the pockets are linked by a plurality of channels extending from pocket to pocket in a predetermined pattern. The channels secure an electronic linking system to the wearable garment. The linking system includes a plurality of flat flexible cables encasing flexible circuitry and microcomputer card connectors. A card connector opens into each pocket to receive a microcomputer card. Each connector is operably coupled to the cables such that when microcomputer cards, including a processor card, a device card and one or more special function cards, such as, for example, PCMCIA cards, that is, PC cards, are placed in the connectors and provided with power, an operational microcomputer system is created.

The garment structure provides a portable, lightweight housing that is easily foldable into a variety of shapes. The modular structure of the card pockets and linking system allows ready changes in the configuration of the microcomputer system by the user.

Use of the present invention with a earphone/microphone input/output device in a spread spectrum, wireless network environment allows hands-free operation as well as ease of use of the microcomputer system.

The invention also comprises a portable computer having elements for computing comprising a plurality of microcomputer elements, at least one flexible wearable member, means for mounting a plurality of said microcomputer elements on said wearable member, and flexible signal relaying means electrically connecting said microcomputer elements in a user determined sequence. In one embodiment the microcomputer elements include input means for inputting data, output means for outputting data, microcomputer card components, and power means for powering the computer.

BRIEF DESCRIPTION OF THE DRAWINGS

FIG. 15 is a perspective view of the first alternate embodiment of the present invention as worn by a user;

FIG. 16 is a second alternate embodiment of the present invention designed for wearing on an arm;

FIG. 17 is a third alternate embodiment of the present invention designed for wearing on a user's head; and, FIG. 18 is a perspective view of the first embodiment of the present invention of FIG. 1 as worn by a user.

FIG. 22 is an end view of the article of FIG. 21 taken along lines 22—22.

FIG. 23 is a plan view of a flexible substrate configured with a plurality of interconnecting leads and microcomputer elements.

FIG. 24 is a top view of a hook and loop charging and storing station arranged for receipt of one embodiment of a personal wearable computer.

FIG. 25 is a top view of a hook and loop charging and storing station.

DETAILED DESCRIPTION OF PREFERRED EMBODIMENTS

Figure 1:
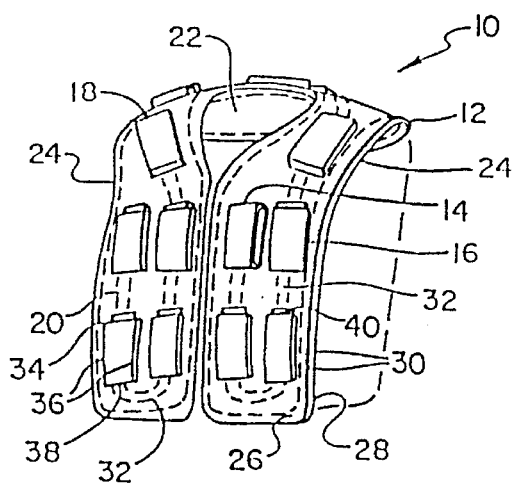
FIG. 1 is a front view of a microcomputer body conformable support structure in accordance with a first embodiment of the present invention.

Reference is now made to the drawings wherein like reference numerals denote like elements throughout the several views.

A microcomputer support and interconnection structure 10 in accordance with a first embodiment of the invention broadly includes a pliable garment 12, a plurality of microcomputer card pockets 14, 16, 18, arranged in a predetermined pattern and a or signal transmission linking system 20. The garment 12 and the pockets 14, 16, 18 may be constructed of the same type of cloth or other pliable material or may be composed of different types of body conforming, pliable material such as are commonly used in the manufacture of garments, uniforms, protective wearables, or similar attire.

Referring to FIG. 1, the pliable garment 12 includes a neck opening 22, opposed arm openings 24, a front face 26 and a back face 28. The garment 12 is composed of one or more layers 30 including structure defining a plurality of channels 32. The neck opening 22 is of sufficient size to fit easily over a user's head. The arm openings 24 permit easy passage of the user's arms through the arm openings 24.

The channels 32 extend between and into each of the pockets 14, 16, 18 in a predetermined sequence. The channels 32 present a characteristic width of sufficient size to encase a flat flexible substrate, such as ribbon cable common in the computer industry. Additional forms of flexible interconnecting leads for transfer of power and/or information are within the scope of this invention and are described below. The sequence of the channels 32 is dependent on the functional configuration of the microcomputer system chosen by the user. It will be understood that the channels 32 may be defined by a plurality of layers 30 or may be defined by a plurality of securing loops. The securing loops, for example, are made by securing string or thread to mesh or net fabric.

Referring to FIGS. 1–4, the card pockets 14, 16, 18 include structure defining a pocket opening 34, opposed side margins 36, and a bottom edge 38. The garment 12, opposed side margins 36 and bottom edge 38 define a card-receiving cavity 40. The card-receiving cavity 40 is of sufficient size to hold a PC card, such as a PCMCIA card or processing card, for example.

For card pockets 16, 18, the opposed side margins 36 are permanently affixed to the garment 12 and the bottom edge 38 is permanently affixed to the garment 12 along only a portion of the bottom edge 38. The bottom edge 38 is not affixed to the garment 12 along the portion of the bottom edge 38 adjacent to the channel 32. For card pocket 14, the bottom edge 38 is permanently affixed to the garment 12 and one of the side margins 36 is affixed to the garment 12 along only a portion of the side margin 36. The portion of the side margin 36 which is not affixed is that portion adjacent to a channel 32.

Figure 4:
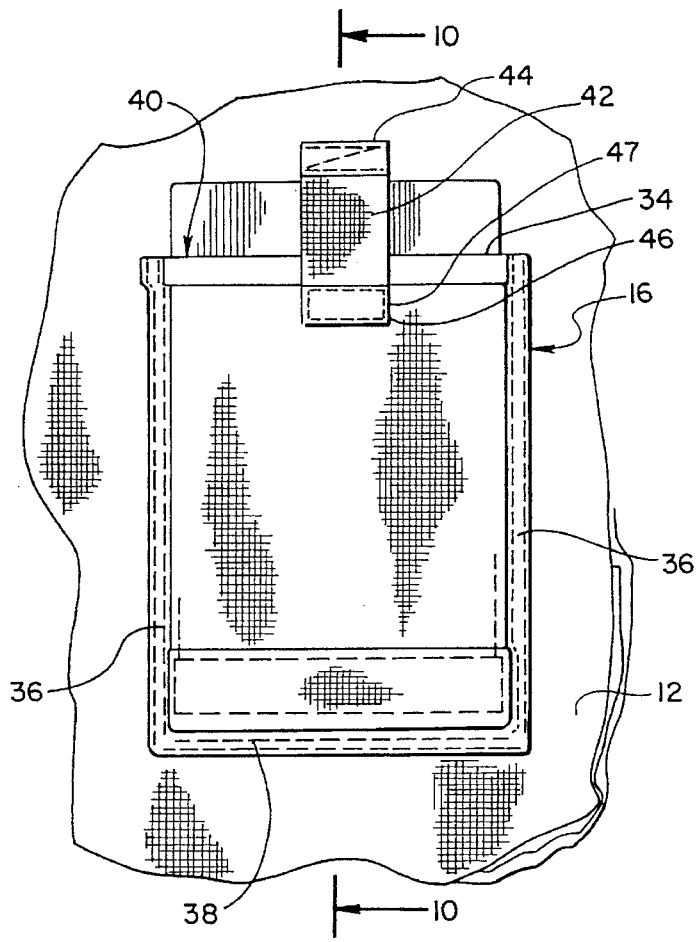
FIG. 4 is a partial front view of a card pocket.
Figure 5:
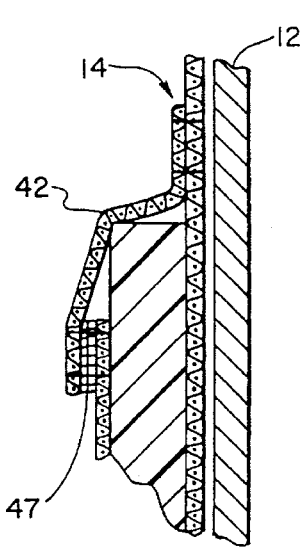
FIG. 5 is a partial sectional view of a card pocket taken from the perspective of line 10—10 of FIG. 4.
Figure 6:
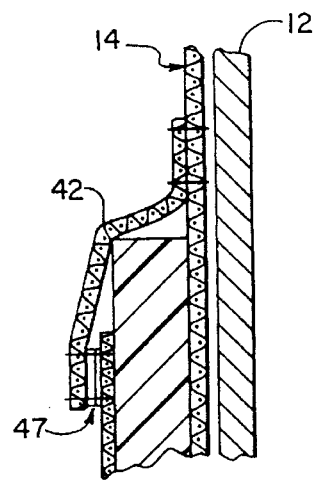
FIG. 6 is an alternate embodiment of a card pocket taken from the same perspective as in FIG. 5.
Figure 7:
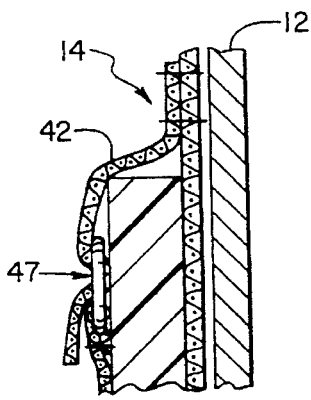
FIG. 7 is an alternate embodiment of a card pocket taken from the same perspective as in FIG. 5.
Figure 8:
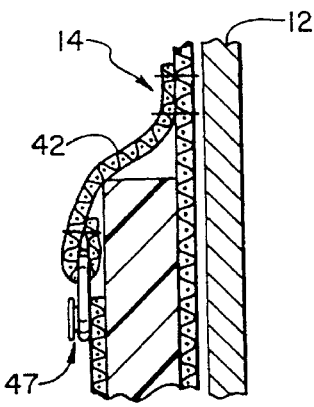
FIG. 8 is an alternate embodiment of a card pocket taken from the same perspective as in FIG. 5.
Figure 9:
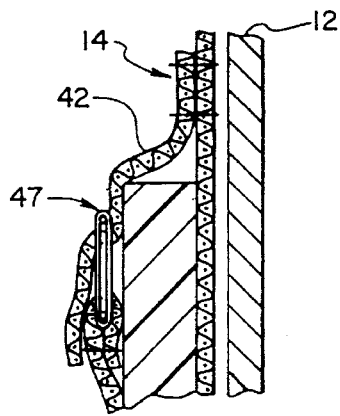
FIG. 9 is an alternate embodiment of a card pocket taken from the same perspective as in FIG. 5.

Referring to FIG. 4, the card pockets 14, 16, 18 may include a securing member 42. The securing member 42 presents an upper edge 44 and a lower edge 46 and is generally rectangular in shape. In this embodiment, the upper edge 44 of securing member 42 is permanently affixed to garment 12 such that the securing member 42 is positioned equidistant from the opposed side margins 36 of the card pockets 14, 16, 18 and above the pocket opening 34. The lower edge 46 is detachably attached to the card pocket 14, 16, 18 such that when the lower edge 46 of the securing member 42 is attached to the card pocket 14 the securing member extends from the garment 12 over the card pocket opening 34 and to the card pocket 14.

Figure 10:
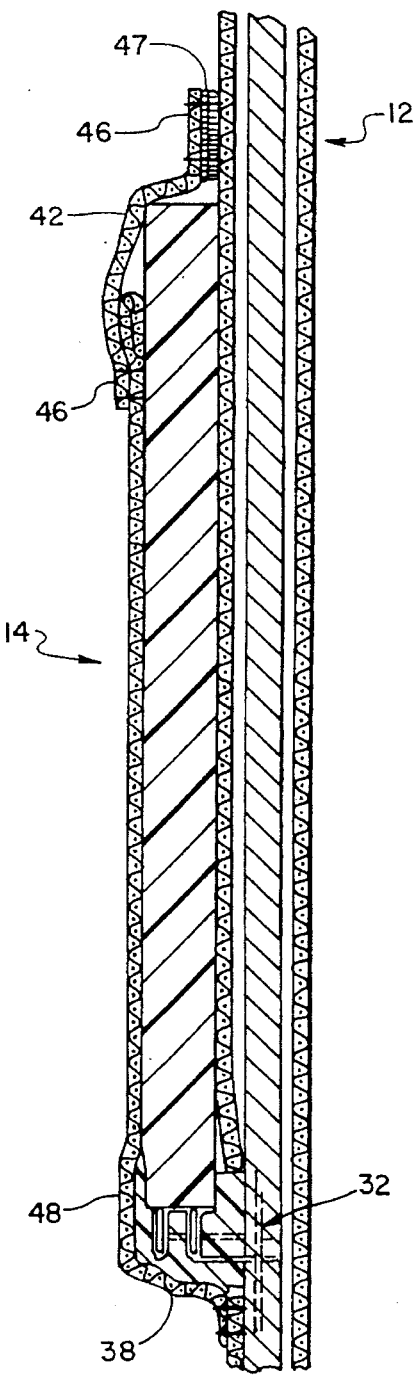
FIG. 10 is a full sectional view of the card pocket taken along line 10—10 of FIG. 4.
Figure 11:
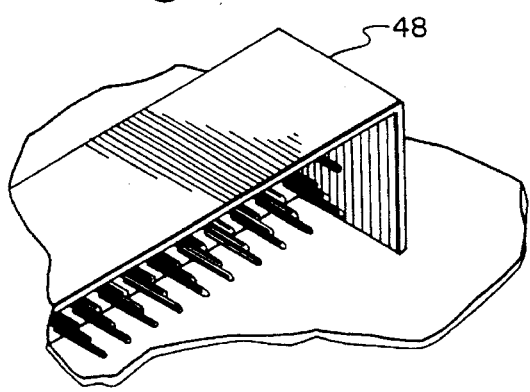
FIG. 11 is a partial perspective view of a connector.
Figure 12:
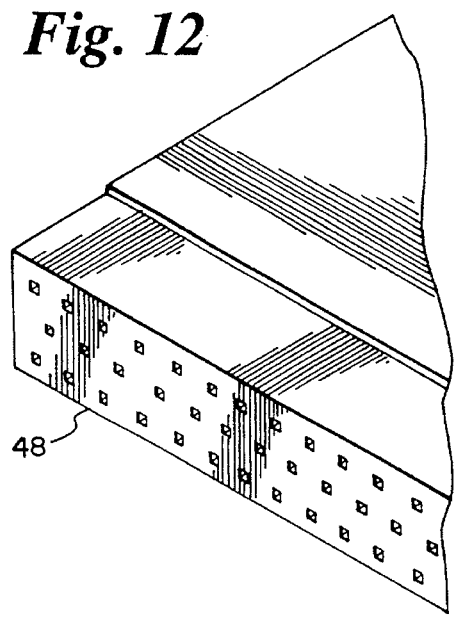
FIG. 12 is an alternate embodiment of a connector.
Figure 13:
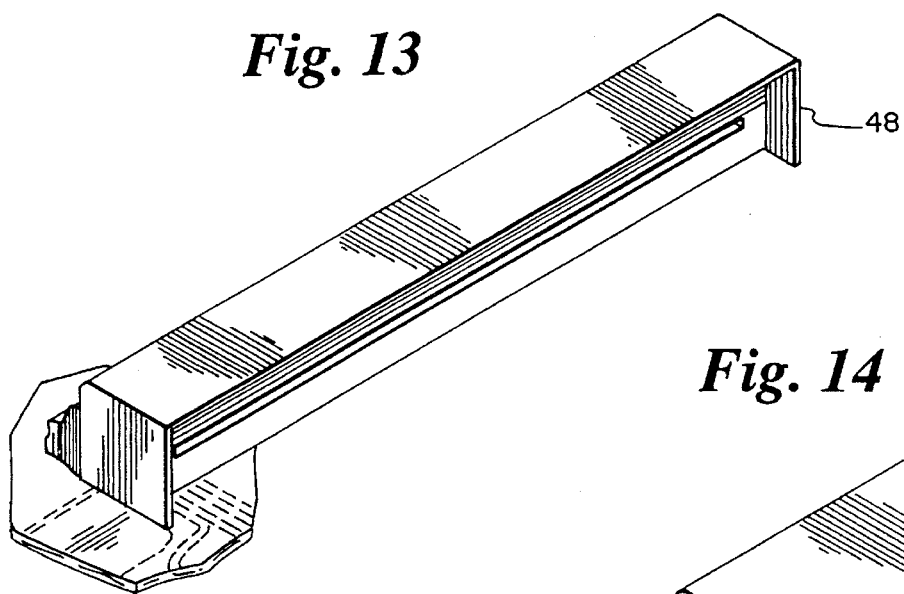
FIG. 13 is an alternate embodiment of a connector.
Figure 14:
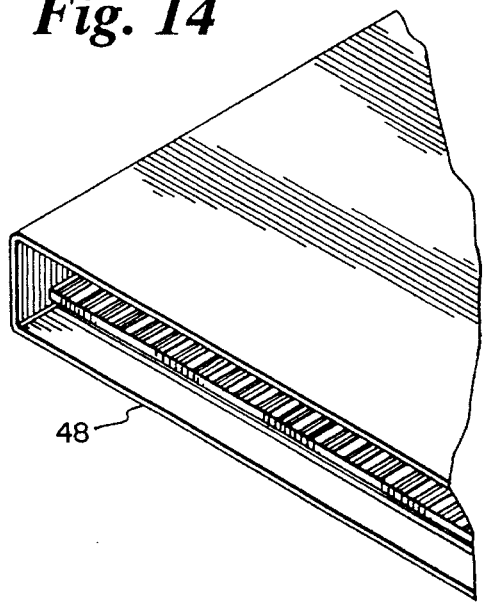
FIG. 14 is an alternate embodiment of a connector.
Figure 19:
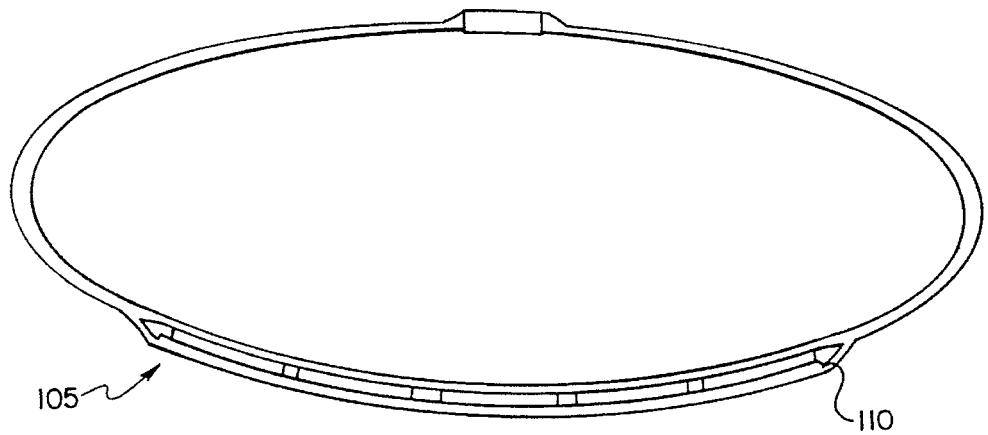
FIG. 19 is an embodiment of the invention configured as a chip on flex type of wearable article.
Figure 20:
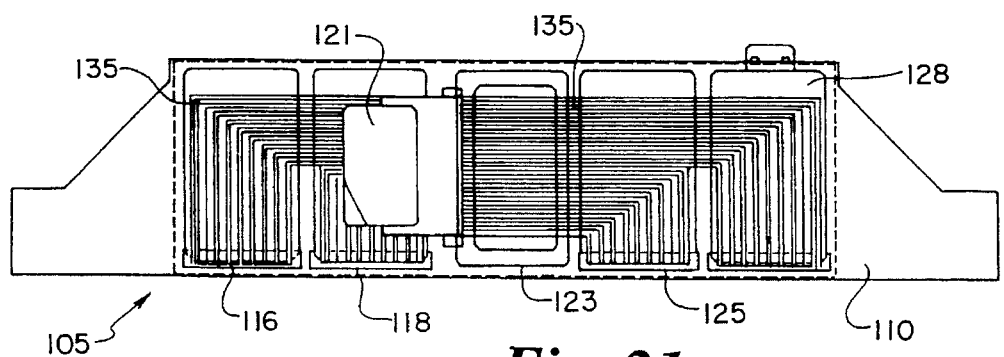
FIG. 20 is a plan view of a flexible substrate configured with a plurality of interconnecting leads and microcomputer elements.

It will be understood that the securing member may be detachably attached to the card pocket 14 by numerous attachment mechanisms 47, such as, for example, referring to FIGS. 5–9, a hook and loop closure mechanism, a snap fastener, a buckle mechanism, a loop and button mechanism, or a clip buckle mechanism. It will also be understood that, as shown in FIG. 10, the lower edge 46 of the securing member 42 may be permanently fixed to the card pocket 14 while the upper edge 44 is detachably attached to the garment 12.

Figure 3:
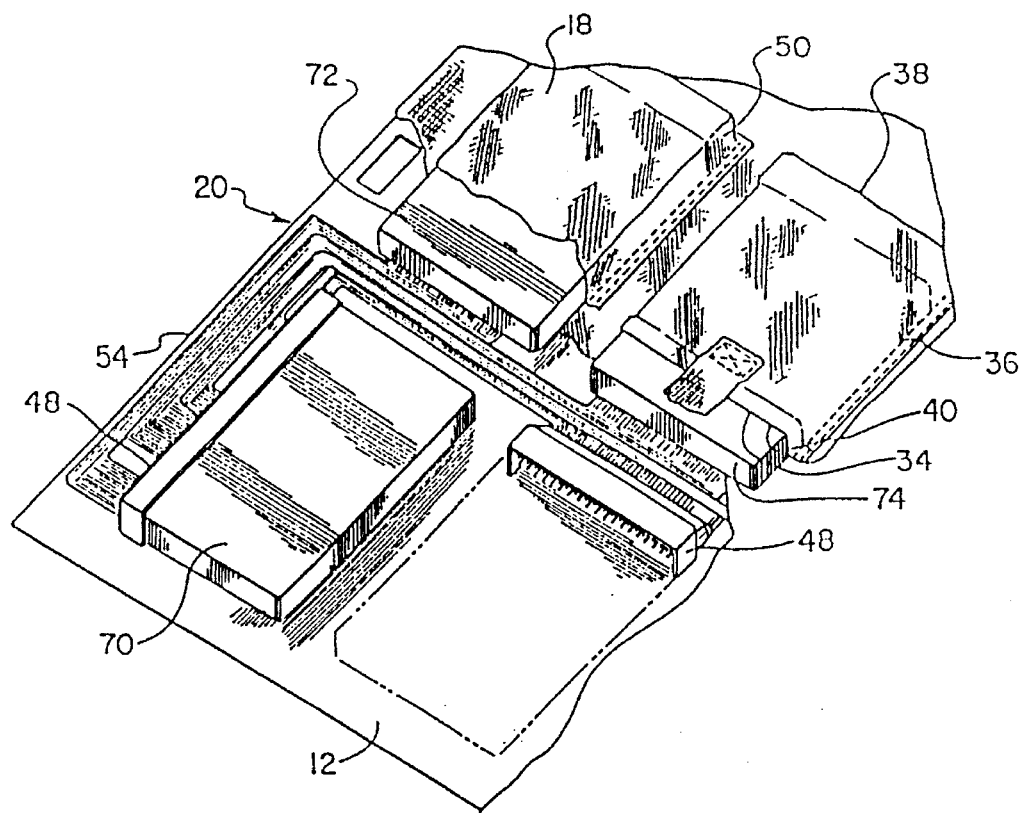
FIG. 3 is a cutaway perspective view of a microcomputer system housed in support structure in accordance with the first embodiment of the present invention.

Referring to FIGS. 1 and 3, the linking system 20 (shown in phantom lines in FIG. 1) includes a plurality of PC card or other device connectors 48 and power connectors 50 operably engaged to a flat flexible cable 54 in a predetermined sequence. Each of the connectors is operably secured within the card-receiving cavity 40 of each card pocket 14, 16, 18 adjacent to each channel 32 such that the mating portion of the connector 48, 50, extends into the card-receiving cavity 40. The flexible cable 54 extends from each connector 48 through the channel 32 to the next connector 50. In one embodiment, the flexible cable 54 is preferably ribbon or brand cable typical in the computer industry which provides flexible circuitry encased in a flat flexible substrate. The sequence of the connectors 48, 50 along the flexible cable 54 is determined by the desired functionality of the microcomputer system. It will be understood that a variety of connectors are possible, such as, for example, referring to FIGS. 11–14, a 236 pin or 88 pin card male or female connector, a flat slot male or female connector or other device connectors common in the electronic industry.

It will also be understood that, for operation of the present invention 10 in a spread spectrum, wireless network, an antenna structure may be incorporated into the circuitry 54 of the linking system 20, or, alternately, the antenna may extend from a connector 48, 50 or a functional component 70, 72, 74. Wireless communication between components in the same portable computer is further described below.

Figure 2:
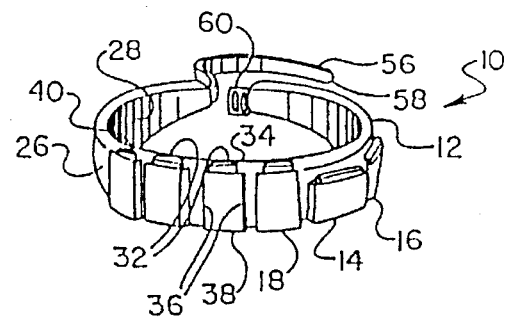
FIG. 2 is a perspective view of a first alternate embodiment of the present invention.

Referring to FIGS. 2 and 15, in a first alternate embodiment of the present invention, garment 12 is a wearable support member in the form of a belt, composed of a long, generally rectangular shaped material presenting opposed ends 56, 58. In this embodiment, card pockets 14, 16, 18 are oriented parallel or perpendicular to each other along the garment 12 at regular intervals. The garment 12 includes a fastening system 60 attached to its opposed ends 56, 58. The fastening system 60, may be a belt buckle and mating holes, a loop and hook closure system, a hook and eye system enclosure, mating snaps, ties or clip buckles, such as those commonly used on backpacks. It will be understood that the fastening system 60 may be any type of system that holds the garment 12 securely to a user's waist or torso.

Referring to FIG. 16, in a second alternate embodiment of the present invention, garment 12 for the support structure 10 is composed of two generally rectangular bands of material 62 and a joint piece 64 and a fastening system 56. The joint piece 64 attaches a portion of each of bands 62 to each other such that the bands 62 may rotate from 0–270 degrees from each other.

Referring to FIG. 17, in a third alternate embodiment of the present invention, garment 12 for the support structure 10 is composed of a cap 66 and cap fasteners 68. The cap 66 is of sufficient size to fit snugly on a user's head without obscuring the user's view. The cap fasteners 68 are attached to the cap and detachably secure the cap to the user's head. The cap fasteners 68 may be, for example, ties or clip buckles or mating snaps or a hook and loop closure system.

In operation, referring to FIGS. 15 and 18, the user inserts the functional components 70, 72, 74, such as PC cards, of the desired microcomputer system into the card pockets 14, 16, 18 and into the appropriate PC card or other device connector 48 and power connector 50. The user then dons the support structure 10 and connects the desired input/output device 76 to the appropriate component(s) 72, 74. It will be understood by those skilled in the art that data input and output may occur through a number of different input and output devices 76, including a keyboard, mouse, microphone/earphone apparatus, touchscreen monitor or bar code scanner. It will also be understood that some devices 76 may be accessible through use of an infrared connection, such as, for example, printers or other computers within a network.

The linking system 20 electronically connects each of the functional components 70, 72, 74 to each other. Once the user activates the power, the microcomputer system is operational and the support structure 10 will follow the movements of the user.

Through the use of a microphone/earphone input/output device, the user may operate the computer system hands-free. The microphone/earphone device may be connected directly to a special function card through a port provided. One example of a communication port for a communication card is that disclosed in U.S. Pat. No. 5,183,404 to Aldous et al., issued Feb. 2, 1993 and assigned to Megahertz Corporation. In operation, for example, the user may hear audio signals through the earphone, such as, for example "Messages waiting" and reply into the microphone by speaking a short key phrase, such as, for example, "Play messages" or "Play first message."

More specifically, for example, referring to FIG. 18, in donning the support structure 10, the user places their neck in the neck opening 22 and their arms in the arm openings 24 such that back face 28 of the garment 12 rests on the user's chest. Referring to FIG. 15, the user secures the support structure 10 around his waist with the fastening system 56.

The input/output device 76 illustrated in FIG. 15 is a headset holding a microphone/earphone combination which the user places on the head in an appropriate position. The earphone/microphone combination is operably connected to a component 74 having voice recognition capabilities and transmitter capabilities, such as RF radio transmission capabilities. An example of such a component 74 is the E.S.P. Voice Recognition & Synthesis Module distributed by Dovatron International, Inc. of Longmont, Colo.

It will be understood by those skilled in the art that a wide range of functionality is possible in choosing the microcomputer system components 70, 72, 74 to place in the card pockets 14, 16, 18. In one embodiment, the components 70, 72, 74 may include a microcomputer processor card and power supply, a device controller card and one or more special function cards. In this embodiment, the preferred sequence of the channels 32 would be from the card pocket 14 with a microcomputer processor connector 50, to the card pocket 16 with a device connector 48 and from the device connector 48 to each of the card pockets 18 with a special function card connector 52. Following this sequence, the microcomputer processor card and power supply 70, would be linked to the device controller card 72 and the device controller card 72 would be linked to each of the special function cards 74 through the linking system 20.

A microcomputer processor card, such as, for example, an Epson Card SCE86325 series marketed by Seiko Epson Corporation of Japan, includes at least 1 MB RAM, 128K ROM, FDC and keyboard controller, VGA controller, one or more serial and parallel port controllers and the functionality of an IBM PC AT microcomputer accessible via a single 236 pin card connector. The Epson Card presents a characteristic length of no more than 86 mm, a characteristic width of no more than 55 mm and a characteristic height of no more than 6 mm. The portable, removable and/or rechargeable power supply is operably coupled to the microcomputer processor card. The power supply presents a characteristic length and width no greater than that of the microcomputer processor card. It will be understood that the power supply may also be contained in its own case and placed in a separate card pocket 14, 16, 18 than the microprocessor card component 70.

The device controller card may be, for example, an E.S.P. PCMCIA Module offered by Dovatron International, Inc of Longmont, Colo. which supports Type 1, 2, or 3 PCMCIA devices and presents dimensions of 1.7"×5.2".

Special function cards may, for example, include PCMCIA cards which provide additional nonvolatile memory, miniature permanent data storage, LAN adapters or fax/modems. Dovatron International, Inc. of Longmont, Colo. advertises an E.S.P. Ethernet Module for providing access to a local area network (LAN) which presents dimension of 1.7"×5.2". The E.S.P. Bar Code Module distributed by Dovatron International, Inc. of Longmont, Colo. offers data input via a bar code scanner. Interaction with peripherals, such as printers or touchscreens remote from the user, is possible by including a special function card that uses infrared light transmission for communication such as, for example, the card used in the NEWTON handheld computer manufactured by Apple Computer of Cupertino, Calif.

It will be understood by those skilled in the art that other microcomputer components for memory, processors, controllers and special function devices may be used, depending on user-determined overall functionality of the microcomputer system.

To use the computer system, the user activates the power and initiates the desired computer function via the input/output device 76. The components 70, 72, 74 are stored and supported by the structure of card pockets 14, 16, 18 and garment 12 in combination with the appropriate connector 48, 50, 52 and any securing member 42. The card pockets 14, 16, 18 are easily accessible to accommodate changes in the components 74 should replacement or upgrades be necessary.

In the above embodiments, the support and interconnection structure 10 is made of cloth, leather or other pliant material that is adaptable to unique body morphologies, and so provides a low cost, lightweight housing/support structure for each system. Use of the support and interconnection structure 10 permits a very flexible microcomputer system that may be easily folded and attached to the user's body for use in diverse environments.

In addition, the support and interconnection structure 10 is easily cleaned by conventional methods. When support structure 10 requires cleaning, the user can readily remove the components 74. The user then places a mating connector, such as, for example, those shown in FIGS. 11–14, in each of the exposed connectors 48, 50, 52. The support and interconnection structure 10 may be washed and air-dried by conventional methods without harm to the circuitry encased.

FIGS. 19–23 disclose additional embodiments of the invention in which the portable computer 105 is manufactured on at least one very thin flexible wearable member 110. A plurality of microcomputer elements, represented by elements 116, 118, 121, 123, 125, and 128 are connected to at least one flexible wearable member 110. Flexible signal relaying means 135 is provided for electrically connecting the microcomputer elements in a user determined sequence to optimize use. For example, expansion may be facilitated by arranging the PCMCIA processor at an end section of a physical sequence rather than in the middle of such sequence. Microcomputer elements include but are not limited to input means for inputting data, output means for outputting data, microcomputer card components, and power source means for powering computer 105.

Figure 21:
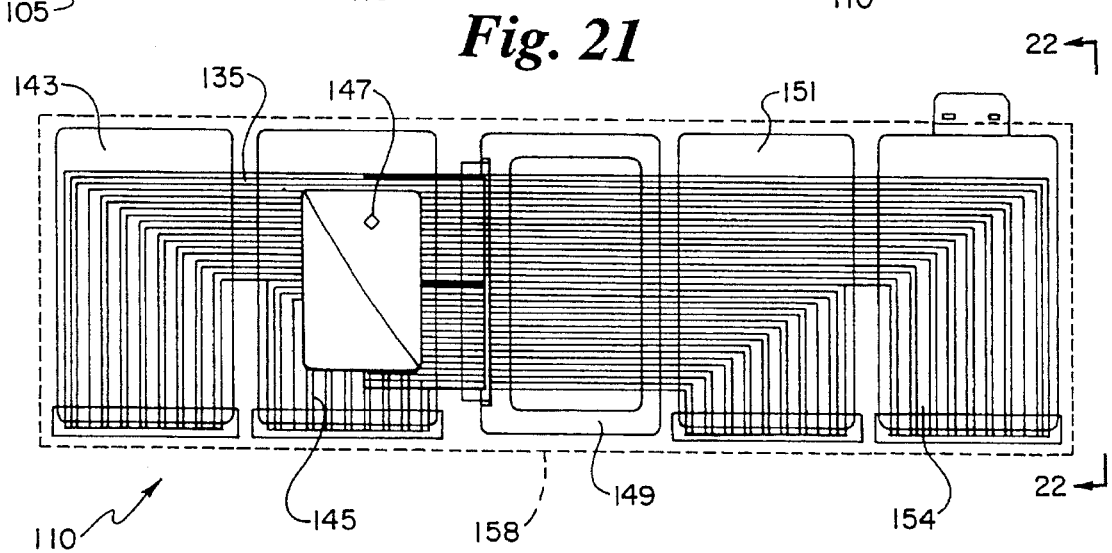
FIG. 21 is an enlarged plan view of an embodiment of the invention which is analogous to that shown in FIG. 19.

FIG. 21 discloses an enlarged idealized plan view of one embodiment of portable computer 105 flexible member 110. This embodiment is representative of the flexible article of the invention which enables considerable breakthroughs in portable computing technology. Member 110 may utilize a variety of microcomputer elements connectable to the flexible signal relaying means 135. It is recognized that the term "signal" is inclusive of both power and information, and the term "relaying" is inclusive of the function also referred to as "transfer". Further, flexible signal relaying means 135 may also be configured for electrically connecting a plurality of components in portable computer 105 using radiofrequency, optical or other non-mechanical means.

Examples of components useful with flexible wearable member 110 include a sound card 143, a flash memory card 145, a chip-on-flex chip set 147 for PCMCIA interface, a processor card 149, an optional card 151 such as for a modem, memory, navigation or position sensing/analysis, and a wireless LAN card 154. Other known components may be substituted for, or added to, those noted above.

Power source means for powering computer 105 includes rigid, semi-rigid or flexible batteries. An example of a flexible battery is a lithium-ion battery manufactured by the Bellcore Corporation. Port means for alternating current connections may also be provided, but is likely not very desirable. Rather, a flexible power source means such as flexible battery 158 provides substantial advantages. FIG. 22 illustrates use of flexible battery 158 shaped as a casing or shell to protect the microcomputer elements. This embodiment has numerous applications, including, for example, lightweight generally tubular shaped portable computers for use by law enforcement, security, special operations, or regular military personnel.

When coupled with means for protection against environmental contamination, such systems enable users to function as battlefield force multipliers in manners not previously known. For example, some uses of flexible wearable member 110 or flexible wearable member 210 (shown in FIG. 23) by a fire control forward observer allow complete hands-free sensing and feedback to rear area forces. This is particularly useful when flexible wearable members 110 or 210 comprise one or more microcomputer elements: for geographic location sensing and computation; for network communication with other users and as a base station; for voice communications; for motion sensing; for digital low light level video operation; for pulse or other radar or sonar use; for multi-directional imaging and/or sensing; for determining elevations or orientations of portions of, including projections from, a user's body; or for monitoring or conditioning the user's medical condition/physiology using, of course, an appropriate input device. These and other features yield capabilities such as a swimmer being able to create underwater surveys by simply transiting an area of water while activating various components such as those noted above. Alternatively, an individual soldier using this invention is now able to query a satellite, generate directional and positional data, and conduct over the horizon military operations using only a small wearable article having the features noted above. Novel civilian applications are also replete when this invention is used. For example, the invention greatly improves existing regimens for remote medical patient, or other personnel, monitoring using, of course, a medical condition information input device and transmitting data as appropriate. This is useful, for example, in either clinical or outpatient settings.

FIGS. 24 and 25 disclose embodiments of recharging and storage devices 221, 321 configured for receiving a flexible wearable portable computer 230 or a power source for the computer. Use of hook and loop fasteners 235, or similar readily operable means for holding the articles together is preferred. Charging means for electrically engaging and recharging each computer is preferably electrically isolated except when a computer is connected for recharging.

Numerous characteristics and advantages of the invention have been set forth in the foregoing description. It will be understood, of course, that this disclosure is, in many respects, only illustrative. Changes can be made in details, particularly in matters of shape, size and arrangement of parts without departing from the scope and spirit of this invention. The invention's scope is defined in the language in which the appended claims are expressed.

What is claimed is:

1. An electronic computing device, comprising:
    a plurality of operably connected microcomputer elements, the microcomputer elements including a processor for performing computer processing functions and at least one input and/or output device; and
    a power supply operably coupled to the plurality of microcomputer elements to provide power to the plurality of microcomputer elements, the power supply comprising a flexible battery that forms a casing of the electronic computing device to protect the plurality of microcomputer elements.

2. The electronic computing device of claim 1, wherein the electronic computing device is a wearable electronic computing device that includes structure for supporting the electronic computing device on the body of a wearer.

3. The electronic computing device of claim 2, wherein the plurality of microcomputer elements comprise at least one PC card, the device further comprising a PC card connector mateably receiving the PC card.

4. The electronic computing device of claim 2, wherein the electronic computing device forms a generally tubular shape.

5. The electronic computing device of claim 1, wherein the flexible battery comprises a lithium-ion-type battery.

6. An electronic computing device for determining information regarding the location of the electronic computing device, the electronic computing device comprising:
    a plurality of operably connected microcomputer elements, the microcomputer elements including a processor for performing computer processing functions and at least one input device for sensing location information, at least two of the microcomputer elements including flexibly interconnected PC cards disposed within separate enclosures, at least one of the microcomputer elements being constructed to perform multi-directional sensing analysis, at least one of the microcomputer elements being constructed to perform navigational analysis; and
    structure for mounting the electronic computing device on the body of a human wearer.

7. The electronic computing device of claim 6, further including a power supply operably coupled to the plurality of microcomputer elements to provide power to the plurality of microcomputer elements, the power supply comprising a flexible battery that forms a casing of the electronic computing device to protect the plurality of microcomputer elements against environmental contamination.

8. The electronic computing device of claim 6, wherein the input device comprises a PC card constructed to sense geographic location information.

9. The electronic computing device of claim 6, wherein one of the microcomputer elements comprises a sensing device for emitting pulse energy to determine underwater depth information.

10. The electronic computing device of claim 6, wherein one of the microcomputer elements is constructed to perform multi-directional imaging functions.

11. A wearable electronic computing device, the computing device comprising:
    a wearable support member supportable by the body of the wearer of the computing device;
    a processor supported by the wearable support member for performing computer processing functions;
    a plurality of PC card connectors supported by the wearable support member, the PC card connectors being shaped to collectively mateably receive a plurality of PC cards;
    a plurality of PC cards slidably received within and mateably secured to the PC card connectors to form a computing configuration for performing at least one desired computing function, the PC cards further being readily insertable into and removable from the PC card connectors to perform different computing functions;
    a signal transmission system interconnecting the processor and the PC card connectors to transmit signals between the processor and the PC cards; and
    a plurality of enclosures supported by the wearable support member, at least one of the PC card connectors being disposed within each of the plurality of enclosures.

12. The wearable electronic computing device of claim 11, wherein at least one of the PC cards is constructed to sense and compute geographic position information.

13. The wearable electronic computing device of claim 11, further comprising a flexible battery operably coupled with at least the processor to provide power to at least the processor, the flexible battery forming a casing for the electronic computing device.

14. The wearable electronic computing device of claim 11, wherein at least one of the PC cards is constructed to direct pulse energy to determine marine depth information.

15. The wearable electronic computing device of claim 11, wherein at least one of the PC cards is constructed to monitor a medical condition of the wearer of the electronic computing device.

16. The computing device of claim 11, wherein the enclosures comprise a plurality of pockets, each of the PC card connectors being enclosed within a respective one of the pockets to receive and enclose a respective PC card.

17. The computing device of claim 11, wherein each PC card connector is entirely enclosed within its enclosure.

18. The wearable electronic computing device of claim 11, wherein the computing configuration performs a voice communication function.

19. The wearable electronic computing device of claim 11, wherein the computing configuration performs a telecommunications function.

20. The wearable electronic computing device of claim 11, wherein the computing configuration performs voice recognition and transmission functions.

21. The wearable electronic computing device of claim 11, wherein the computing configuration interacts with a wireless network environment.

22. An electronic computing device for determining information regarding the location of the electronic computing device, the electronic computing device comprising:

a plurality of operably connected microcomputer elements, the microcomputer elements including a processor for performing computer processing functions and at least one input device for sensing location information, at least two of the microcomputer elements including flexibly interconnected PC cards, at least one of the microcomputer elements being constructed to perform multi-directional sensing analysis, at least one of the microcomputer elements being constructed to perform navigational analysis;

structure for mounting the electronic computing device on the body of a human wearer; and a power supply operably coupled to the plurality of microcomputer elements to provide power to the plurality of microcomputer elements, the power supply comprising a flexible battery that forms a casing of the electronic computing device to protect the plurality of microcomputer elements against environmental contamination.

23. The wearable electronic computing device of claim 22, wherein the transmission function includes a radio transmission function.

* * * * *